United States Patent [19]

Neher

[11] 4,317,224

[45] Feb. 23, 1982

[54] OIL-COOLED RADAR TRANSMITTER APPARATUS

[75] Inventor: Karl Neher, Zürich, Switzerland

[73] Assignee: Siemens-Albis AG, Zürich, Switzerland

[21] Appl. No.: 168,584

[22] Filed: Jul. 14, 1980

[30] Foreign Application Priority Data

Aug. 7, 1979 [CH] Switzerland ............. 7228/79

[51] Int. Cl.³ ............................................. H04B 1/03
[52] U.S. Cl. .................................. 455/128; 361/382;
328/11; 455/91
[58] Field of Search ................. 455/91, 117, 128, 347;
361/381, 382, 385, 422; 328/8, 11

[56] References Cited
U.S. PATENT DOCUMENTS

| | | | |
|---|---|---|---|
| 2,086,905 | 7/1937 | Evans | 328/11 |
| 2,160,098 | 5/1939 | Williams | 328/11 |
| 2,187,011 | 1/1940 | Braden | 455/128 |
| 2,262,044 | 11/1941 | Philpott | 328/11 |
| 3,248,636 | 4/1966 | Colaiaco | 361/382 |
| 3,858,090 | 12/1974 | Lehmann | 361/385 |

*Primary Examiner*—Robert L. Richardson
*Assistant Examiner*—Tommy P. Chin
*Attorney, Agent, or Firm*—Werner W. Kleeman

[57] ABSTRACT

A radar transmitter apparatus comprising a radar transmitter equipped with a modulator arranged in an oil-filled housing, the modulator being held in spaced relationship with respect to the inner walls of the housing in order to form an intermediate space for the convection flow of the oil. The housing is substantially trough or vat-shaped and covered by a trough or vat-shaped cover member. In the internal chamber or space between the cover member and the modulator, which internal space is wetted by the oil, there is arranged, on the one hand, a magnetron attached at the cover member and, on the other hand, a thyratron which is mounted directly below an opening at the cover member. This opening is closable by means of oil sealed throughpassage means.

6 Claims, 2 Drawing Figures though not particularly illustrated manner, rendered accessible by the removal of the cover member 3. Equally a thyratron 5 is mounted at the cover member 3 directly below a closable opening 32 of the cover member 3, so that the thyratron 5 likewise can be rendered accessible. Since, also in this case, the current circuit of the thyratron 5 extends within the modulator 1, the same is also well screened.

OIL-COOLED RADAR TRANSMITTER APPARATUS

BACKGROUND OF THE INVENTION

The present invention relates to a new and improved construction of a radar transmitter apparatus.

Generally speaking, the radar transmitter apparatus of the present invention is of the type comprising a radar transmitter which possesses a modulator arranged within an oil-filled housing, the modulator being retained in spaced relationship with respect to an inner marginal or wall surface of the housing in order to form an intermediate space for convection flow.

In radar transmitter units there are required special measures in order to cool, screen and monitor the transmitter. The thermal load of the transmitter and that of the additional devices needed for operating the entire installation must be maintained within permissible temperature limits.

In German Pat. No. 2,532,543 there is disclosed to the art a mechanical and electrical autonomous radar transmitter unit which is composed of modular elements. This radar transmitter unit comprises a transmitter tube, a cooled modulator and a high-voltage supply device. Within such unit there is provided a base plate containing air throughpass openings as the base structure for the modulator assembly in which there is enclosed by a cylindrical-shaped sheet metal body the modulator equipped with cooling ribs in a manner such that the cooling ribs together with the walls of the sheet metal body form air channels and at which there is laterally mounted the transmitter tube. The arrangement constituted by the modulator assembly is employed for the convection cooling of the entire transmitter unit or at least components of such transmitter unit. Such autonomous radar transmitter unit or apparatus can be advantageously installed within an armored track vehicle.

Furthermore, from Swiss Pat. No.424,970 it is known to retain within an oil encapsulated electrical device form or mold shells in spaced relationship from a coil and also from a core, so that there is formed a respective intermediate space between the form shells and the coil and between the form shells and the core.

Such measures for cooling an electrical device are not however sufficient to comply with the special requirements which are imposed when cooling, screening and monitoring a radar transmitter unit having relatively small dimensions.

SUMMARY OF THE INVENTION

Therefore, with the foregoing in mind it is a primary object of the present invention to provide a new and improved construction of radar transmitter apparatus which is not associated with the aforementioned drawbacks and limitations of the prior art proposals heretofore discussed.

Another and more specific object of the present invention aims at providing a new and improved construction of a radar transmitter apparatus or unit which possesses optimum screening, cooling and monitoring for a spatially extremely limited installation.

Now in order to implement these and still further objects of the invention, which will become more readily apparent as the description proceeds, the radar transmitter apparatus of the present development is manifested by the features that there is provided a vat or trough-shaped housing which is closed by a substantially vat or trough-shaped cover member or cover. Within the inner space or chamber, which is wetted by oil, there is accommodated between the cover member and the modulator, on the one hand, the dome of a magnetron which is attached at the cover member and, on the other hand, there is accommodated within such internal or inner chamber a thyratron directly below an opening at the cover member. This opening is closed by a closure, and electrical lines lead through the cover member by means of oil-sealed or oil-tight passages or through passage means.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
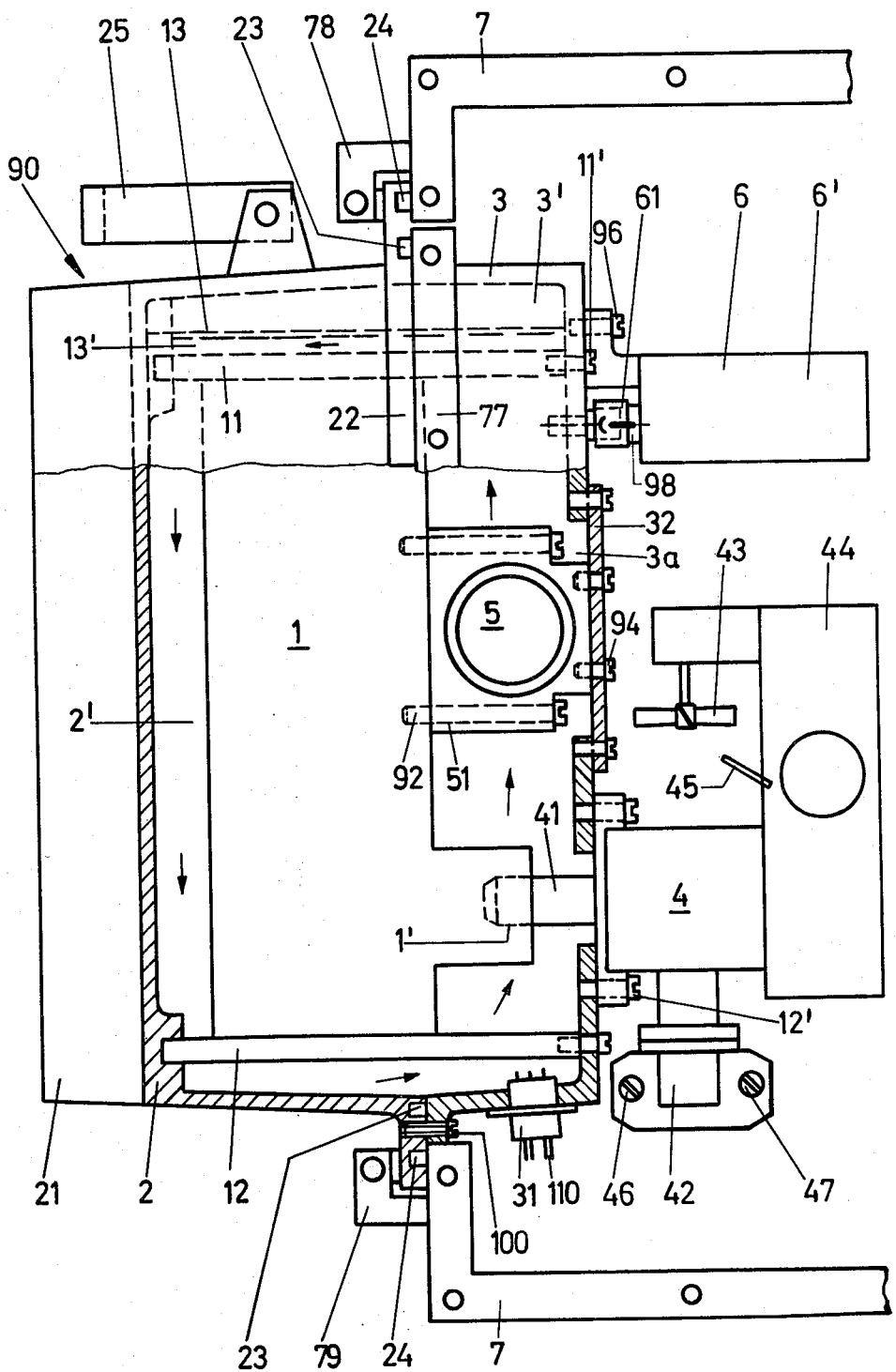
FIG. 1 is a sectional schematic view of a radar transmitter of a radar transmitter apparatus unit according to the invention.

Describing now the drawings, the radar transmitter illustrated in FIG. 1 and generally designated by reference character 90, will be seen to comprise a modulator 1 which is accommodated within a substantially trough or vat-shaped housing 2 equipped with cooling ribs 21. The housing 2 and the cooling ribs 21 are preferably formed of cast aluminum. This housing 2 is connected by means of a flange 22 with a substantially trough or vat-shaped cover member or cover 3, likewise formed of cast aluminum. The inner chamber or compartment 2' of the vat-shaped housing 2, which is enlarged by the inner chamber or space 3' of the vat-shaped cover member 3, is filled with oil, as generally indicated by referenc character 13'. The flange 22 and the cover member 3 are connected to one another, for instance threadably interconnected by threaded bolts 100 or equivalent fastening expedients. An oil seal 23 is incorporated between the interconnected flange 22 and the cover member 3, as best seen by referring to FIG. 1. Leading through the cover member 3, by means of a screened, oil-tight passage or throughpass means 31, are power supply control and measuring lines, generally indicated by reference character 110, these lines or conductors preferably being introduced by means of a coaxial screened, threaded-in filter or an oil-tight plug at which there directly merges a filter. The flange 22 is provided with a so-called EMC-seal 24 (electromagnetic compatible seal), which additionally also can be watertight.

A magnetron 4 is secured in an oil-tight fashion at the cover member 3 such that the magnetron dome 41, while extending through the cover member 3, can be connected with a high-voltage plug, generally indicated by reference character 1', of the modulator 1. The magnetron 4 is provided with a waveguide outlet 42. Since the current circuit of the magnetron 4 extends within the modulator 1 which is accommodated in the internal space 2', 3' between the housing 2 and the cover member 3, it is screened extremely well. Also the microwaves emanating from the dome 41 are screened in this manner. The magnetron 4 is provided in a well known manner with a ventilator or fan 43 which is arranged at a tuning transmission or gearing drive 44.

A thyratron 5 is arranged within the vat-shaped space 3' of the cover 3 directly below an opening 3a provided at such cover or cover member 3, and hence, the thyratron 5 is easily accessible and thus can be readily exchanged. The opening 3a is covered in an oil-tight fashion by a suitable closure or cover 32. The thyratron 5 is secured to a support or carrier 51 which, in turn, is connected, for instance by threaded bolts 92 with the modulator 1 and by means of sealed bolts or screws 94 with the closure 32 such that there is afforded a good electrical contact.

A transmitter trigger 6' is enclosed in a separate housing 6 formed, for instance, of cast aluminum and is threadably connected with the cover member 3, for instance by the threaded bolts 96 in order to provide a good electrically conductive ground contact. The trigger pulses of the transmitter trigger 6' are delivered to the modulator 1 by means of a coaxial line or cable 98 having an automatically pluggable coaxial plug 61. The transmitter trigger housing 6, which is not arranged in the internal space or chamber 2', 3' between the housing 2 and the cover 3, is situated at the suction side of the ventilator or fan 43 and is cooled by such ventilator. A portion of the air flow generated by the ventilator 43 is branched-off or deflected by a transversely positioned lamellae or blade 45, and therefore also serves for cooling the motor of the tuning transmission or drive 44.

Figure 2:
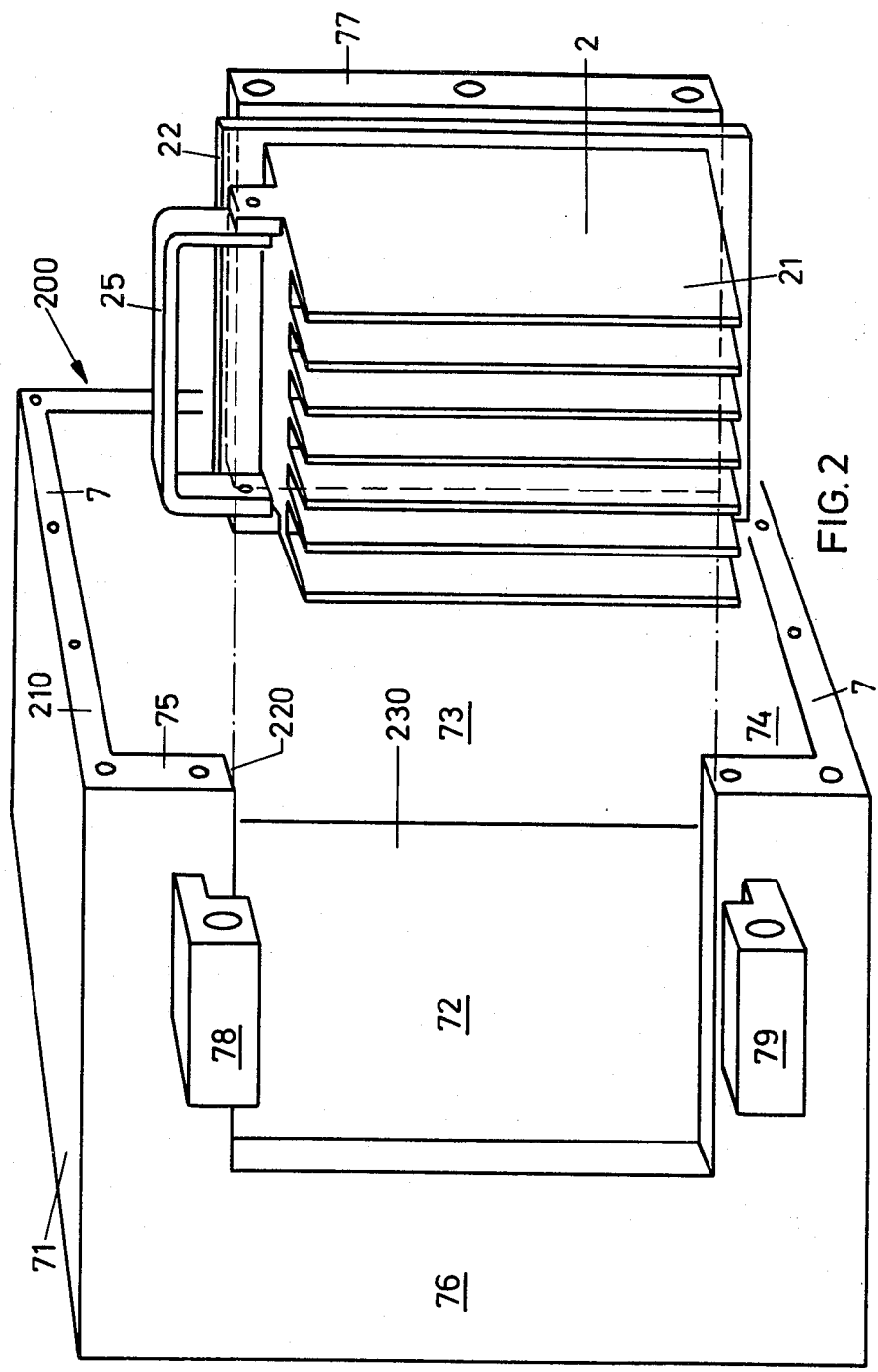
FIG. 2 is a perspective view of the radar transmitter and the related cabinet or case.

The radar transmitter 90 is integrated into a radar transmitter apparatus or unit, generally indicated by reference character 200 in FIG. 2. This radar transmitter unit 200 comprises a support frame 7 at which there are mounted the cover plates 71, 72, 73 and 74, in order to impart to the radar transmitter unit 200 at least an approximately case-like or suitcase configuration. At one edge 75 of the casing or box-like cabinet 210 the support frame 7 is provided with an interrupted portion 220 whose length is somewhat greater than the height of the cover 3 and at this location there is provided for the frame 7 a cover plate 76 having a recess or cut-out 230 which is somewhat wider than the depth of the cover 3. The cover or cover member 3 of the radar transmitter 90 can be inserted through the opening 220 into the recess 230 such that the housing 2 continuously bears at the casing wall formed by the cover plate 76 provided with the recess or cut-out 230. Additionally, the cover 3 is provided with a frame counter element 77 which, after insertion of the radar transmitter 90 into the radar transmitter unit 200, completes the open support frame 7. The radar transmitter 90 therefore can be introduced from the front of the support frame 7 through its frame opening 220 into the recess 230, thus imparting the casing or luggage-like configuration to the radar transmitter unit or apparatus 200. This luggage-like or casing-like configuration of the casing 200 is however not completed because the housing 2 provided with the cooling ribs 21 laterally protrudes out of the casing 210. The flange 22 and the casing 210 are pressed against one another, while utilizing the EMC-seal means 24, by the pressing or contact devices 78 and 79. The casing 210 contains, apart from the components visible in the showing of the drawings, additional components which are conventional for radar transmitter equipment, but however are unimportant for purposes of explaining the invention and therefore have not been further shown in order to preserve clarity in illustration and to simplify the drawings.

The support frame 7 is threadably connected with the cover 3 by means of a cover plate and is thus mechanically fixed and retained. The modulator 1 is secured within the trough-shaped housing 2 and the cover 3 by means of the bolts 11, 12 and fixing screws 11', 12' at different locations of the housing 2 such that the oil can imbue or wet the entire surface of the packaged modulator 1. The housing 2 together with the cover member 3 is closed in an oil-tight fashion and does not require any expansion vessels. The expansion of the oil 13, due to heating thereof, is countered by an air cushion which is located over the oil level 13. The internal pressure does not exceed any dangerous thresholds.

The previously described radar transmitter unit or apparatus 200 functions in the following manner: the oil cooling is designed such that the convection flow of the oil 13 develops in the form of a closed circulation system, as indicated by the arrows, to the extent that the equipment is in its operating mode. The magnetron 4 and the thyratron 5 deliver part of the developed thermal energy to the trough or vat-shaped cover member 3 and the oil 13. The heated oil 13 therefore ascends within the internal chamber or space 3' of the trough-shaped cover member 3 and flows within the internal chamber or space 2' of the trough-shaped housing 2 downwardly at the region of the cooling ribs or fins 21. The magnetron 4 is additionally cooled by the ventilator 43. By means of the connection between the flange 22 and the frame counter element 77 there is transmitted additional heat to the support frame 7, and thus the surface of the casing 210 acts as an additional cooling surface.

As the maximum oil temperature there is contemplated a temperature in the order of about 120° C. Since the operating temperature of the transmitter trigger 6' is around 80° C., the transmitter trigger 6' is not arranged within the internal space or chamber 2', 3' between the housing 2 and the cover member 3. Also, the transmitter trigger 6' is cooled by the ventilator 43. This construction enables the equipment to be cooled extensively by cooling air which has not been cleaned. This is extremely important since the preparation of clean, dust-free air entails a considerable amount of work. Under the term "cleaned" air or equivalent expressions, there is to be understood air whose contaminants have been removed by conventional cleaning means and processes or the like.

The radar transmitter 90 can be pulled out of the casing 210 by using a tiltable handgrip 25 in a very simple manner in that, all of the plugs as well as the connection screws 46, 47 at the waveguide outlet 42 of the magnetron 4 and the contact or pressing devices 78, 79 are released.

For removing the magnetron 4 and the thyratron 5 the radar transmitter 90 is placed upon the cooling ribs 21, and the air cushion is displaced below the cover member 3. Thereafter, the tuning drive 44 and the transmitter trigger 6' are dismantled.

In order to remove the transmitter trigger 6' which is mounted within the trigger housing 6 it is sufficient to loosen the screws or threaded bolts 96, at the cover member 3 and to pull such transmitter trigger 6' out of the automatically connecting plugs. Three such screws or threaded bolts 96 have been found to be adequate for attachment of the transmitter trigger housing 6 at the cover member 3.

In order to remove the magnetron-tuning drive 44 there are released two screws or threaded bolts and a clamping screw. After the screws at the magnetron flange have been released then the magnetron 4 can be simply pulled out. The thyratron 5, after removing the closure 32 at the cover 3, likewise can be easily dismantled.

While there are shown and described present preferred embodiments of the invention, it is to be distinctly understood that the invention is not limited thereto, but may be otherwise variously embodied and practiced within the scope of the following claims. Accordingly,

What I claim is:

1. A radar transmitter apparatus comprising:
 a radar transmitter;
 said radar transmitter containing:
  a substantially trough-shaped housing filled with oil;
  a modulator arranged within said oil-filled housing;
  means for mounting said modulator within said housing so as to form therein an intermediate space for the convection flow of the oil;
  a substantially trough-shaped cover member for closing said trough-shaped housing;
  said housing and said cover member forming therein an internal chamber containing the oil;
  a magnetron having a dome;
  means for attaching said magnetron to said cover member;
  means for securing said modulator at the dome of said magnetron;
  said cover member having an opening; a thyraton;
  means for mounting said thyraton directly below said opening at said cover member;
  said mounting means comprising a closure for closing said opening of said cover member; and
  oil-tight throughpassage means provided for said cover member and adapted to receive therethrough electrical line means.

2. The radar transmitter apparatus as defined in claim 1, further including:
 a transmitter trigger;
 a separate housing for housing said transmitter trigger;
 electrically conductive ground contact means for connecting said transmitter trigger with said cover member; and
 coaxial line means having an automatically pluggable coaxial plug means for connecting said transmitter trigger with said modulator.

3. The radar transmitter apparatus as defined in claim 1, further including:
 support frame means provided with cover plates;
 said support frame means serving to receive the radar transmitter;
 said radar transmitter and said support frame means and cover plates being configured such as to impart to the radar transmitter apparatus an essentially casing-like configuration; and
 said housing of said radar transmitter protruding out of said support frame means.

4. The radar transmitter apparatus as defined in claim 3, wherein:
 said support frame means includes a side wall constituting part of said casing-like configuration;
 said side wall having a recess;
 a frame counter element for filling said recess; and
 said frame counter element being provided with the cover member which is introduced into said recess.

5. The radar transmitter apparatus as defined in claim 2, further including:
 tuning means provided for said magnetron;
 ventilator means provided for said tuning means;
 lamellae means cooperating with said ventilator means such that said magnetron, said tuning means and said housing of the transmitter trigger are cooled by said ventilator means.

6. The radar transmitter apparatus as defined in claim 1, wherein:
 said housing is provided with cooling ribs.

* * * * *